(12) United States Patent
Shahoian et al.

(10) Patent No.: US 11,884,144 B2
(45) Date of Patent: Jan. 30, 2024

(54) VEHICLE WITH TWIN CANOPY DOORS

(71) Applicant: Glydways, Inc., South San Francisco, CA (US)

(72) Inventors: Erik Shahoian, Sonoma, CA (US); Patrick Kessler, San Francisco, CA (US)

(73) Assignee: Glydways Inc., South San Francisco, CA (US)

( * ) Notice: Subject to any disclaimer, the term of this patent is extended or adjusted under 35 U.S.C. 154(b) by 0 days.

(21) Appl. No.: 17/838,257

(22) Filed: Jun. 12, 2022

(65) Prior Publication Data
US 2022/0297515 A1    Sep. 22, 2022

Related U.S. Application Data

(63) Continuation of application No. 16/591,127, filed on Oct. 2, 2019, now Pat. No. 11,358,445.

(60) Provisional application No. 62/742,109, filed on Oct. 5, 2018.

(51) Int. Cl.
*B60J 5/04* (2006.01)
*B60J 5/12* (2006.01)
*B60J 5/02* (2006.01)

(52) U.S. Cl.
CPC ........... *B60J 5/0479* (2013.01); *B60J 5/02* (2013.01); *B60J 5/12* (2013.01)

(58) Field of Classification Search
CPC . B60J 5/02; B60J 5/0477; B60J 5/0479; B60J 5/12
USPC ............................................. 296/147
See application file for complete search history.

(56) References Cited

U.S. PATENT DOCUMENTS

| | | | |
|---|---|---|---|
| 9,266,413 B2 | 2/2016 | Engler | |
| 10,137,765 B2* | 11/2018 | Gong | B60J 1/12 |
| 10,633,908 B1 | 4/2020 | Loeb | |
| 2017/0217351 A1* | 8/2017 | Jaradi | B60N 3/063 |
| 2017/0225593 A1* | 8/2017 | De Saulles | B60N 2/01 |

FOREIGN PATENT DOCUMENTS

| | | |
|---|---|---|
| DE | 816637 C | 10/1951 |
| DE | 1010391 B | 6/1957 |
| FR | 2241199 A | 4/1975 |
| FR | 2700504 A1 | 7/1994 |
| FR | 2700505 A1 | 7/1994 |
| FR | 2958253 A1 | 10/2011 |

(Continued)

OTHER PUBLICATIONS

Google translate for DE 391 (Year: 1957).

*Primary Examiner* — Hilary L Gutman
(74) *Attorney, Agent, or Firm* — Brownstein Hyatt Farber Schreck, LLP

(57) ABSTRACT

A vehicle may include a frame structure, a body mounted to the frame structure, and a door structure defining a first side segment defining a portion of a first side of the vehicle, a second side segment defining a portion of a second side of the vehicle opposite the first side, and a roof segment extending from the first side segment to the second side segment and defining a portion of a top of the vehicle. The vehicle may also include a door mechanism coupled to the door structure and configured to move the door structure between a closed position and an open position, relative to the body.

20 Claims, 9 Drawing Sheets

(56) References Cited

FOREIGN PATENT DOCUMENTS

| WO | WO9930957 A1 | 6/1999 |
| WO | WO2019/098381 A1 | 5/2019 |
| WO | WO2020/108852 A1 | 6/2020 |

\* cited by examiner

VEHICLE WITH TWIN CANOPY DOORS

CROSS-REFERENCE TO RELATED APPLICATION(S)

This application is a continuation patent application of U.S. Non-provisional patent application Ser. No. 16/591,127, filed Oct. 2, 2019, and titled "Vehicle with Twin Canopy Doors," which is a non-provisional patent application of and claims the benefit of U.S. Provisional Patent Application No. 62/742,109, filed Oct. 5, 2018, and titled "Vehicle with Twin Canopy Doors," the disclosures of which are hereby incorporated herein by reference in their entirety.

FIELD

The described embodiments relate generally to vehicles, and, more particularly, to vehicles with twin canopy doors that open to provide unrestricted access to the interior of the vehicle.

BACKGROUND

Vehicles, such as cars, trucks, vans, busses, trams, and the like, are ubiquitous in modern society. Cars, trucks, and vans are frequently used for personal transportation to transport relatively small numbers of passengers, while busses, trams, and other large vehicles are frequently used for public transportation. Such road-going vehicles are often optimized for a particular use. For example, high-performance cars may be optimized for speed and handling, while vans may be optimized for comfort and passenger capacity.

SUMMARY

A vehicle may include a frame structure, a body mounted to the frame structure, and a door structure defining a first side segment defining a portion of a first side of the vehicle, a second side segment defining a portion of a second side of the vehicle opposite the first side, and a roof segment extending from the first side segment to the second side segment and defining a portion of a top of the vehicle. The vehicle may also include a door mechanism coupled to the door structure and configured to move the door structure between a closed position and an open position, relative to the body.

The vehicle may also include an additional door structure defining an additional first side segment defining an additional portion of the first side of the vehicle, an additional second side segment defining an additional portion of the second side of the vehicle opposite the first side, and an additional roof segment extending from the additional first side segment to the additional second side segment and defining an additional portion of the top of the vehicle. The vehicle may also include an additional door mechanism coupled to the additional door structure and configured to move the additional door structure between an additional closed position and an additional open position, relative to the body. The door mechanism and the additional door mechanism may be configured to open and close the door structure and the additional door structure substantially simultaneously.

The door mechanism may include a first four-bar linkage coupling the door structure to the body and a second four-bar linkage coupling the door structure to the body, wherein the first and second four-bar linkages are configured to articulate the door structure along a path relative to the body when the door structure is moved between the closed position and the open position. The first and second four-bar linkages may have substantially identical configurations.

The body may at least partially define an interior volume of the vehicle, and an opening providing access to the interior volume of the vehicle may be defined when the door structure is in the open position. The body may define two opposing body segments set apart by a roofless span, and the roofless span may be exposed when the door structure is in the open position.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
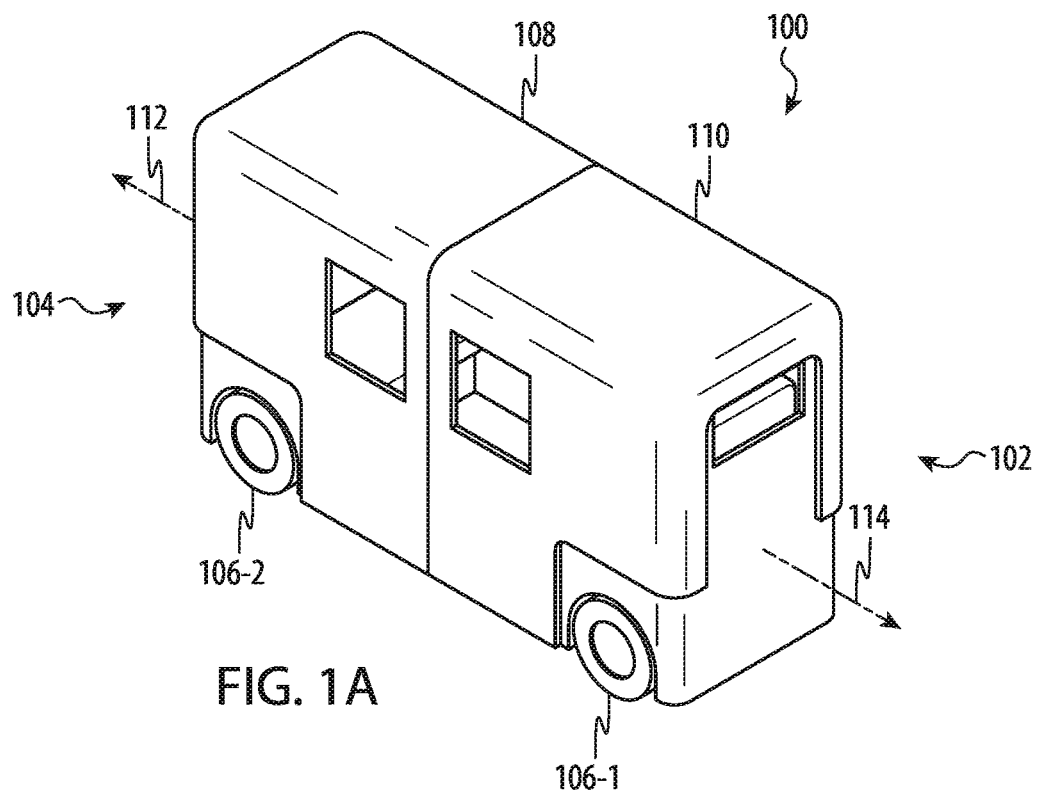
FIGS. 1A-1B depict an example vehicle.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to vehicles that may be used in a transportation system in which numerous vehicles may be autonomously operated to transport passengers and/or freight. For example, a transportation system or service may provide a fleet of vehicles that operate along a roadway to pick up and drop off passengers at either pre-set locations or stops, or at dynamically selected locations (e.g., selected by a person via a smartphone). While the vehicles may be adapted for independent operation, the vehicle fleet or portions of the vehicle fleet may be controlled by a central processing unit or computerized system.

Vehicles in such a transportation system may be configured to operate autonomously. As used herein, the term "autonomous" may refer to a mode or scheme in which vehicles can operate without continuous, manual control by a human operator. For example, vehicles may navigate along a roadway (and without an on-board driver) using a system of sensors that guide the vehicle, and a system of automatic drive and steering mechanisms that control the speed and direction of the vehicle. In some cases, the vehicles may not require steering, speed, or directional control from the passengers, and may exclude controls such as passenger-accessible accelerator and brake pedals, steering wheels, and other manual controls. In some cases, the vehicles may include manual drive controls that may be used for maintenance, emergency overrides, or the like. Such controls may be hidden, stowed, or otherwise not directly accessible by a user during normal vehicle operation. For example, they may be designed to be accessed only by trained operators, maintenance personnel, or the like.

Autonomous operation need not exclude all human or manual operation of the vehicles or of the transportation system as a whole. For example, human operators may be able to intervene in the operation of a vehicle for safety, convenience, testing, or other purposes. Such intervention may be local to the vehicle, such as when a human driver takes controls of the vehicle, or remotely, such as when an operator sends commands to the vehicle via a remote control system. Similarly, some aspects of the vehicles may be controlled by passengers of the vehicles. For example, a passenger in a vehicle may select a target destination, a route, a speed, control the operation of the doors and/or windows, or the like. Accordingly, it will be understood that the terms "autonomous" and "autonomous operation" do not necessarily exclude all human intervention or operation of the individual vehicles or of the overall transportation system.

The vehicles in an autonomous transportation system as described herein may be operated on a fully public roadway, or on a closed system of lanes. A closed system of lanes may, for example, include a lane or set of lanes that is adjacent a public roadway and in some cases shares a common tarmac road surface. In cases where a closed system of lanes is used, the lanes may be customized for the operation of the vehicles and the transportation system as a whole. The lanes may have markers, signs, fiducials, or other objects or components on, in, or proximate the lanes to help the vehicles operate. For example, vehicles may include sensors that can sense magnetic markers that are embedded in the road surface to help guide the vehicles and allow the vehicles to determine their location, speed, orientation, or the like. As another example, the roadway may have signs or other indicators that can be detected by cameras on the vehicle and that provide information such as location, speed limit, traffic flow patterns, and the like.

The vehicles in the transportation may include various sensors, cameras, communications systems, processors, and/or other components or systems that help facilitate autonomous operation. For example, the vehicles may include a sensor array that detects magnets or other markers embedded in the road surface and which help the vehicle determine its location, position, and/or orientation on the roadway. The vehicles may also include wireless vehicle-to-vehicle communications systems, such as optical communications systems, that allow the vehicles to inform one another of operational parameters such as their braking status, acceleration status, their next maneuver (e.g., right turn, left turn, planned stop), their number or type of payload (e.g., humans or freight), or the like. The vehicles may also include wireless communications systems to facilitate communication with a central operations system that has supervisory command and control authority over the transportation system.

The vehicles in the transportation system may be designed to enhance the operation and convenience of the transportation system. For example, a primary purpose of the transportation system may be to provide comfortable, convenient, rapid, and efficient personal transportation. To provide personal comfort, the vehicles may be designed for easy passenger ingress and egress, and may have comfortable seating arrangements with generous legroom and headroom. The vehicles may also have a sophisticated suspension system that provides a comfortable ride and a dynamically adjustable parameters to help keep the vehicle level, positioned at a convenient height, and to ensure a comfortable ride throughout a range of variable load weights.

Conventional personal automobiles are designed for operation primarily in only one direction. This is due in part to the fact that drivers are oriented forwards, and operating in reverse for long distances is generally not safe or necessary. However, in autonomous vehicles, where humans are not directly controlling the operation of the vehicle in real-time, it may be advantageous for a vehicle to be able to operate bidirectionally. For example, the vehicles in a transportation system as described herein may be substantially symmetrical, such that the vehicles lack a visually or mechanically distinct front or back. Further, the wheels may be controlled sufficiently independently so that the vehicle may operate substantially identically no matter which end of the vehicle is facing the direction of travel. This symmetrical design provides several advantages. For example, the vehicle may be able to maneuver in smaller spaces by potentially eliminating the need to make U-turns or other maneuvers to re-orient the vehicles so that they are facing "forward" before initiating a journey.

Figure 1B:
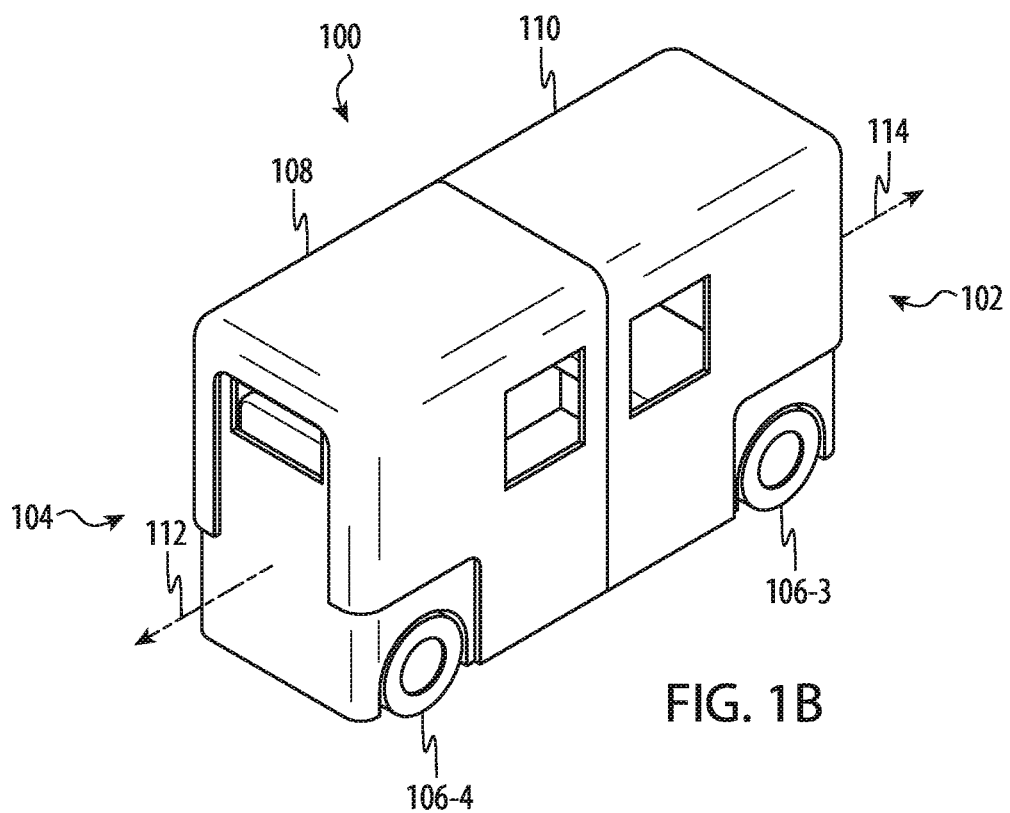

FIGS. 1A and 1B are perspective views of an example vehicle 100 that may be used in a transportation system as described herein. FIGS. 1A-1B illustrate the symmetry and bidirectionality of the vehicle 100. In particular, the vehicle 100 defines a first end 102, shown in the forefront in FIG. 1A, and a second end 104, shown in the forefront in FIG. 1B. In some examples and as shown, the first and second ends 102, 104 are substantially identical. Moreover, the vehicle 100 may be configured so that it can be driven with either end facing the direction of travel. For example, when the vehicle 100 is travelling in the direction indicated by arrow 114, the first end 102 is the leading end of the vehicle 100, while when the vehicle 100 is traveling in the direction indicated by arrow 112, the second end 104 is the leading end of the vehicle 100.

The vehicle 100 may also include wheels 106 (e.g., 106-1-106-4). The wheels 106 may be paired according to their proximity to an end of the vehicle. Thus, wheels 106-1, 106-3 may be positioned proximate the first end 102 of the vehicle and may be referred to as a first pair of wheels 106, and the wheels 106-2, 106-4 may be positioned proximate the second end 104 of the vehicle and may be referred to as a second pair of wheels 106. Each pair of wheels may be driven by at least one motor (e.g., an electric motor), and each pair of wheels may be able to steer the vehicle. Because each pair of wheels is capable of turning to steer the vehicle, the vehicle may have similar driving and handling characteristics regardless of the direction of travel. In some cases, the vehicle may be operated in a two-wheel steering mode, in which only one pair of wheels steers the vehicle 100 at a given time. In such cases, the particular pair of wheels that steers the vehicle 100 may change when the direction of travel changes. In other cases, the vehicle may be operated in a four-wheel steering mode, in which the wheels are operated in concert to steer the vehicle. In a four-wheel steering mode, the pairs of wheels may either turn in the same direction or in opposite directions, depending on the steering maneuver being performed and/or the speed of the vehicle.

The vehicle 100 may also include doors 108, 110 that open to allow passengers and other payloads (e.g., packages, luggage, freight) to be placed inside the vehicle 100. The doors 108, 110, which are described in greater detail herein, may extend over the top of the vehicle such that they each define two opposite side segments. For example, each door defines a side segment on a first side of the vehicle and another side segment on a second, opposite side of the vehicle. The doors also each define a roof segment that extends between the side segments and defines part of the roof (or top side) of the vehicle. In some cases, the doors 108, 110 resemble an upside-down "U" in cross-section and may be referred to as canopy doors. The side segments and the roof segment of the doors may be formed as a rigid structural unit, such that all of the components of the door (e.g., the side segments and the roof segment) move in concert with one another. In some cases, the doors 108, 110 include a unitary shell or door chassis that is formed from a monolithic structure. The unitary shell or door chassis may be formed from a composite sheet or structure including, for example, fiber glass, carbon composite, and/or other lightweight composite materials.

Figure 2A:
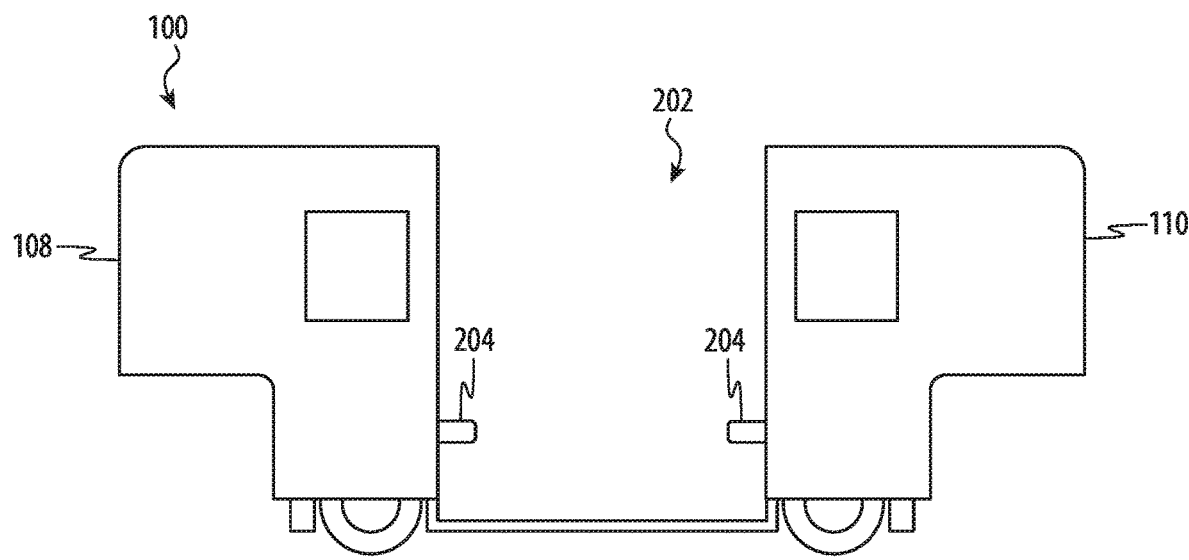
FIGS. 2A-2B depict the vehicle of FIGS. 1A-1B with its doors open.
Figure 2B:
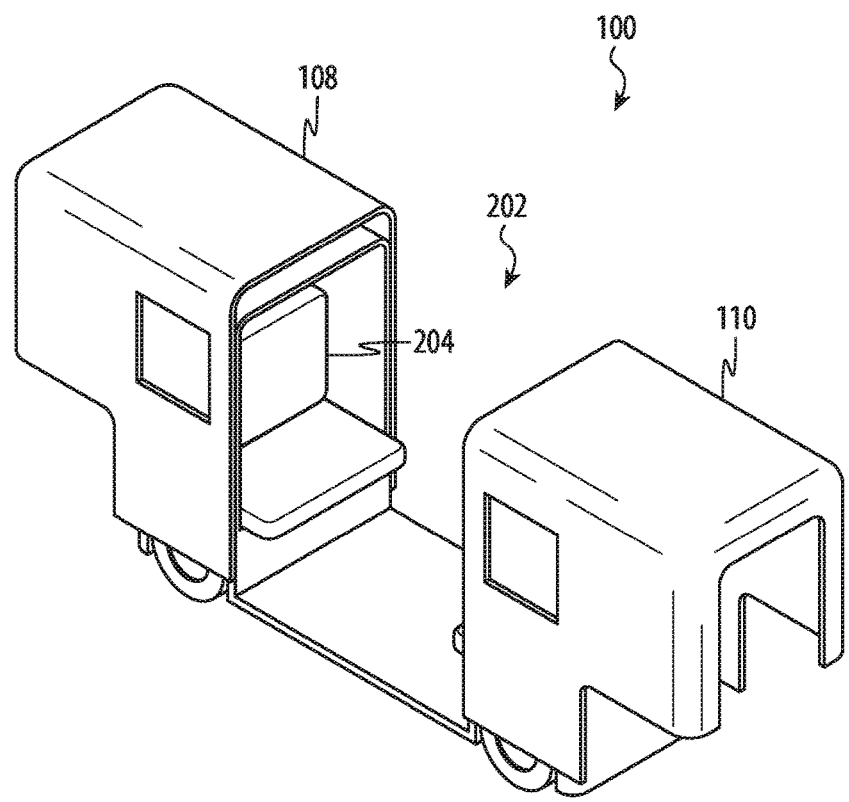

FIGS. 2A and 2B are side and perspective views of the vehicle 100 with the doors 108, 110 in an open state. Because the doors 108, 110 each define two opposite side segments and a roof segment, an uninterrupted internal space 202 may be revealed when the doors 108, 110 are opened. In the example depicted in FIGS. 2A and 2B, when the doors 108, 110 are opened, an open section may be defined between the doors 108, 110 that extends from one side of the vehicle 100 to the other. This may allow for unimpeded ingress and egress into the vehicle 100 by passengers on either side of the vehicle 100. The lack of an overhead structure when the doors 108, 110 are opened may allow passengers to walk across the vehicle 100 without a limit on the overhead clearance.

The vehicle 100 may also include seats 204, which may be positioned at opposite ends of the vehicle 100 and may be facing one another. As shown the vehicle includes two seats 204, though other numbers of seats and other arrangements of seats are also possible (e.g., zero seats, one seat, three seats, etc.). In some cases, the seats 204 may be removed, collapsed, or stowed so that wheelchairs, strollers, bicycles, or luggage may be more easily placed in the vehicle 100.

Figure 3A:
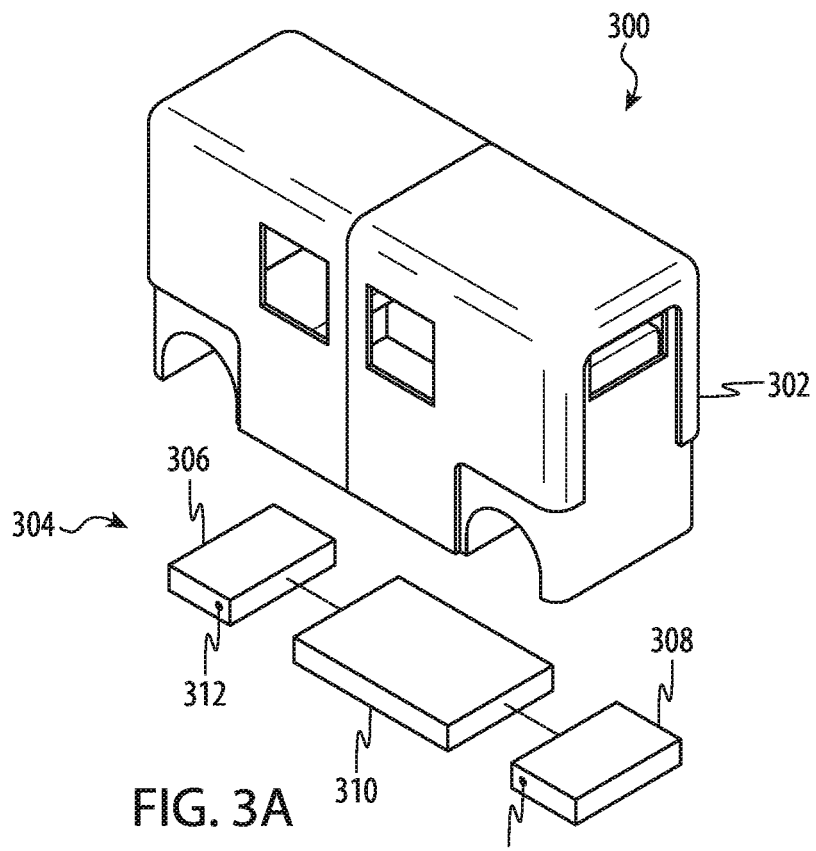
FIG. 3A depicts a partial exploded view of an example configuration of a vehicle.
Figure 3B:
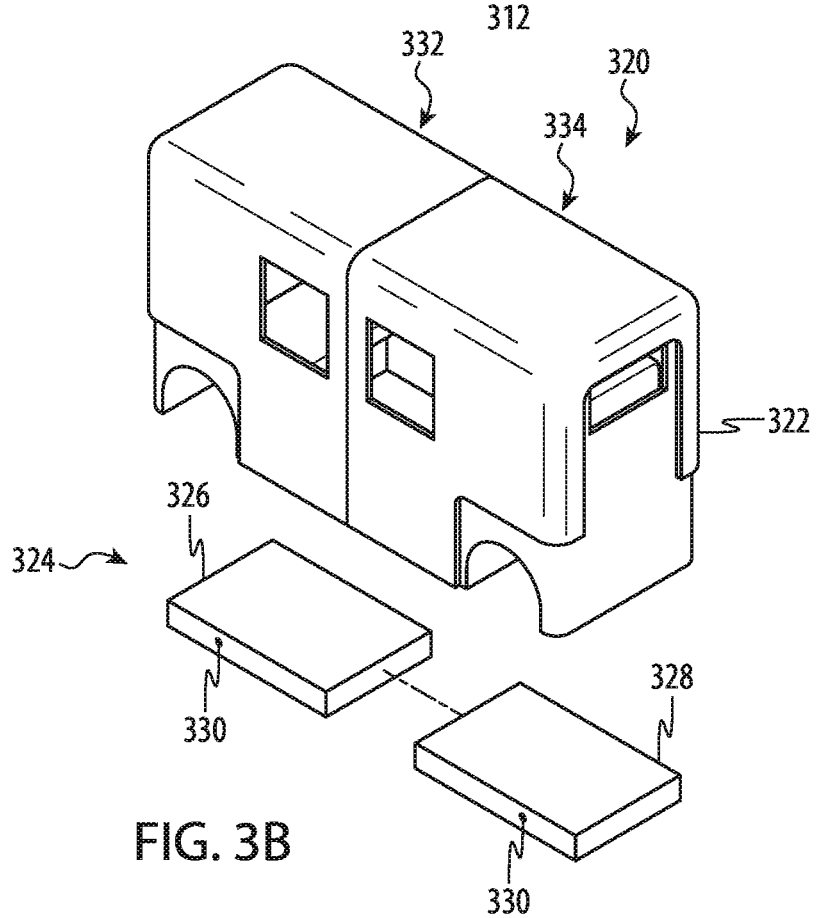
FIG. 3B depicts a partial exploded view of another example configuration of a vehicle.

Vehicles for use in a transportation system as described herein, such as the vehicle 100, may be designed for safe and comfortable operation, as well as for ease of manufacture and maintenance. To achieve these advantages, the vehicles may be designed to have a frame structure that includes many of the structural and operational components of the vehicle (e.g., the motor, suspension, batteries, etc.) and that is positioned low to the ground. A body structure may be attached or secured to the frame structure. FIGS. 3A-3B illustrate partial exploded views of vehicles, which may be embodiments of the vehicle 100, showing example configurations of a frame structure and body structure. As described below, the low position of the frame structure combined with the relatively light-weight body structure produces a vehicle with a very low center of gravity, which increases the safety and handling of the vehicle. For example, a low center of gravity reduces the rollover risk of the vehicle when the vehicle encounters slanted road surfaces, wind loading, sharp turns, or the like, and also reduces body roll of the vehicle during turning or other maneuvers. Further, by positioning many of the operational components of the vehicle, such as motors, batteries, control systems, sensors (e.g., sensors that detect road-mounted magnets or other markers), and the like, on the frame structure, manufacture and repair may be simplified.

FIG. 3A is a partial exploded view of a vehicle 300, which may be an embodiment of the vehicle 100. Details of the vehicle 100 may be equally applicable to the vehicle 300, and will not be repeated here. The vehicle 300 may include a body structure 302, which may include doors (e.g., the doors 108, 110, described above) and other body components, and a frame structure 304 to which the body structure 302 is attached.

The frame structure 304 may be formed by coupling together several structural components. For example, FIG. 3A shows a frame structure 304 that includes a base module 310 and first and second wheel modules 306, 308. The wheel modules 306, 308 may be the same or similar to one another, and may in fact be interchangeable with one another. In this way, assembly and repair may be simplified as wheel modules may be replaced and/or swapped easily and quickly, and fewer unique replacement parts may be necessary to produce and/or store.

The wheel modules 306, 308 may include drive, suspension, and steering components of the vehicle. For example, the wheel modules may include wheel suspension systems (which may define or include wheel mounts, axles, or hubs, represented in FIG. 3A as points 312), steering systems, drive motors, and optionally motor controllers. Wheels may be mounted to the wheel suspension systems via the wheel mounts, axles, hubs or the like. The drive motors may include one or more drive motors that drive the wheels, either independently or in concert with one another. The drive motors may receive power from a power source (e.g., battery) that is mounted on the base module 310. Motor controllers for the drive motors may also be mounted on the wheel modules 306, 308, or they may be mounted on the base module 310.

The suspension systems may be any suitable type of suspension system. In some cases, the suspension systems include independent suspension systems for each wheel. For example, the suspension systems may be double-wishbone torsion-bar suspension systems. The suspension systems may also be dynamically adjustable, such as to control the ride height, suspension preload, damping, or other suspension parameters while the vehicle is stationary or while it is moving. Other suspension systems are also contemplated, such as swing axle suspension, sliding pillar suspension, MacPherson strut suspension, or the like. Moreover, spring and damping functions may be provided by any suitable component or system, such as coil springs, leaf springs, pneumatic springs, hydropneumatic springs, magneto-rheological shock absorbers, and the like.

The wheel modules 306, 308 may also include steering systems that allow the wheels to be turned to steer the vehicle. In some cases the wheels may be independently steerable, or they may be linked (e.g., via a steering rack) so that they always point in substantially the same direction during normal operation of the vehicle. As noted above, because each pair of wheels is steerable, either wheel module 306, 308 may be the leading or trailing wheel module at a given time.

The base module 310 may include components such as batteries, motors and mechanisms for opening and closing the vehicle's doors, control systems (including computers or other processing units), and the like. The wheel modules 306, 308 may be attached to the base module 310 in a secure manner, such as via bolts or other fasteners, interlocking structures, rivets, welds, or the like. In some cases, the wheel modules 306, 308 are removable from the base module 310 in a non-destructive manner (e.g., without having to cut weldments or metal or otherwise damage the structural material of the module) so that the modules may be replaced or disassembled from one another for ease of service or repair. For example, the wheel modules 306, 308 may be removably attached to the base module 310 using one or more threaded fasteners or pins.

FIG. 3B is a partial exploded view of a vehicle 320, which may be an embodiment of the vehicle 100. Details of the vehicle 100 may be equally applicable to the vehicle 320, and will not be repeated here. The vehicle 320 may include a body structure 322, which may include doors (e.g., the doors 108, 110, described above) and other body components, and a frame structure 324 to which the body structure 322 is attached.

Whereas the frame structure 304 in FIG. 3A included a base module and two wheel modules, the frame structure 324 in FIG. 3B includes two wheel modules 326, 328 and no separate base module. The wheel modules 326, 328 may include all of the components of the wheel modules 306, 308 in FIG. 3B, but may also include components that were coupled to or otherwise integrated with the base module 310. For example, each wheel module 326, 328 may include wheel suspension (which may include wheel mounts or axles, illustrated in FIG. 3B as points 330), steering systems, drive motors, and motor controllers.

The wheel modules 326, 328 may also include batteries, control systems (including computers or other processing units), motors and mechanisms for opening and closing the vehicle's doors, and the like. In some cases, components of the wheel modules 326, 328 may be configured to be backup or redundant components. For example, each wheel module 326, 328 may include a control system that is capable of controlling all of the operations of the vehicle, including controlling the components and mechanisms of its own wheel module as well as those of the other wheel module of the frame structure 324. Accordingly, if one control system malfunctions or fails, the other control system on the other wheel module may seamlessly assume operation of the vehicle.

The wheel modules 326, 328 may be attached to one another in a secure manner, such as via bolts or other fasteners, interlocking structures, rivets, welds, or the like. In some cases, the wheel modules 326, 328 are removable from one another in a non-destructive manner (e.g., without having to cut weldments or metal or otherwise damage the structural material of the module) so that the modules may be replaced or disassembled from one another for ease of service or repair. For example, the wheel modules 326, 328 may be removably attached to the base module 310 using one or more threaded fasteners or pins.

While the body structure 322 is shown in FIG. 3B as separate from the frame structure 324, other embodiments may integrate the body structure 322 with the frame structure 324. For example, the body structure 322 may have a first segment 332 and a second segment 334, which may be structurally coupled to the wheel modules 326, 328, respectively. In this way, structural components of the body structure 322 and the frame structure 324 that require or benefit from precise alignment may be assembled to a common substructure, thereby reducing misalignment between those components. For example, as described herein, door mechanisms may include a four-bar linkage with one pivot positioned on the first body segment 332, and another pivot positioned on or near the wheel module 326 (e.g., the wheel module directly below that body segment). By building the first body segment 332 to the underlying wheel module 326, the relative position between these pivots may be more tightly controlled allowing for more predictable or reliable operation of the door mechanism. Additionally, in many cases the alignment between the first and second segments 332, 334 of the body structure 322 may be less important than the alignment between a given segment of the body structure 322 and the underlying wheel module. Accordingly, integrating separate segments of the body structure 322 with separate wheel modules may improve the tolerances and alignment of the components of the vehicle.

FIGS. 3A-3B illustrate example configurations of vehicles and frame structures. Other configurations are also possible, however. Moreover, the frame structures and the body structures shown in FIGS. 3A-3B are intended more as schematic representations of these components, and these components may include other structures that are omitted from FIGS. 3A-3B for clarity. Additional structural connections and integrations may be made between the body structures and the frame structures than are explicitly represented in FIGS. 3A-3B. For example, components a door mechanism that open and close the doors of the body structures may be joined to both the doors and to the frame structures.

As noted above, vehicles for use in a transportation system as described herein may be outfitted with doors that open to provide easy ingress and egress from the vehicle. For example, the doors may open to reveal a large, roofless opening that provides access to the interior volume of the vehicle. As described above, the doors may define portions of two opposite sides of the vehicle, as well as a portion of the top of the vehicle. In order to allow these doors to open in the manner shown and described with respect to FIGS. 2A-2B, the doors may be coupled to the frame and/or a body of the vehicle by door linkage mechanisms that are configured to move the doors between a closed position (as shown in FIG. 1A) and an open position (as shown in FIGS. 2A-2B). As described herein, the door linkage mechanisms may include mechanical linkages, motors, gear systems, and the like.

Figures 4A, 4B:
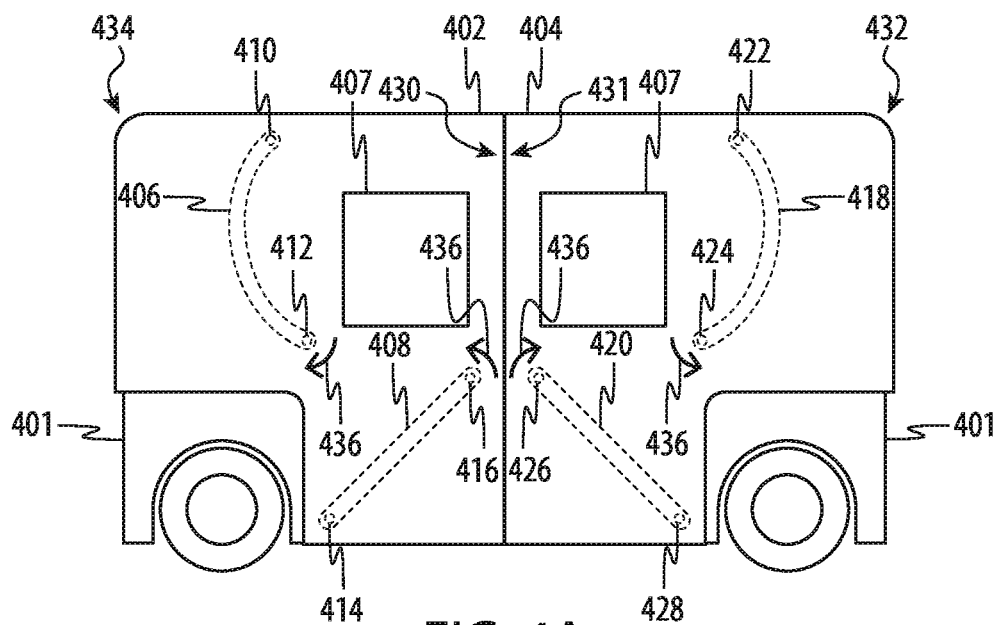
FIGS. 4A-4C depict an example vehicle with a pair of doors at various positions.
Figure 4C:
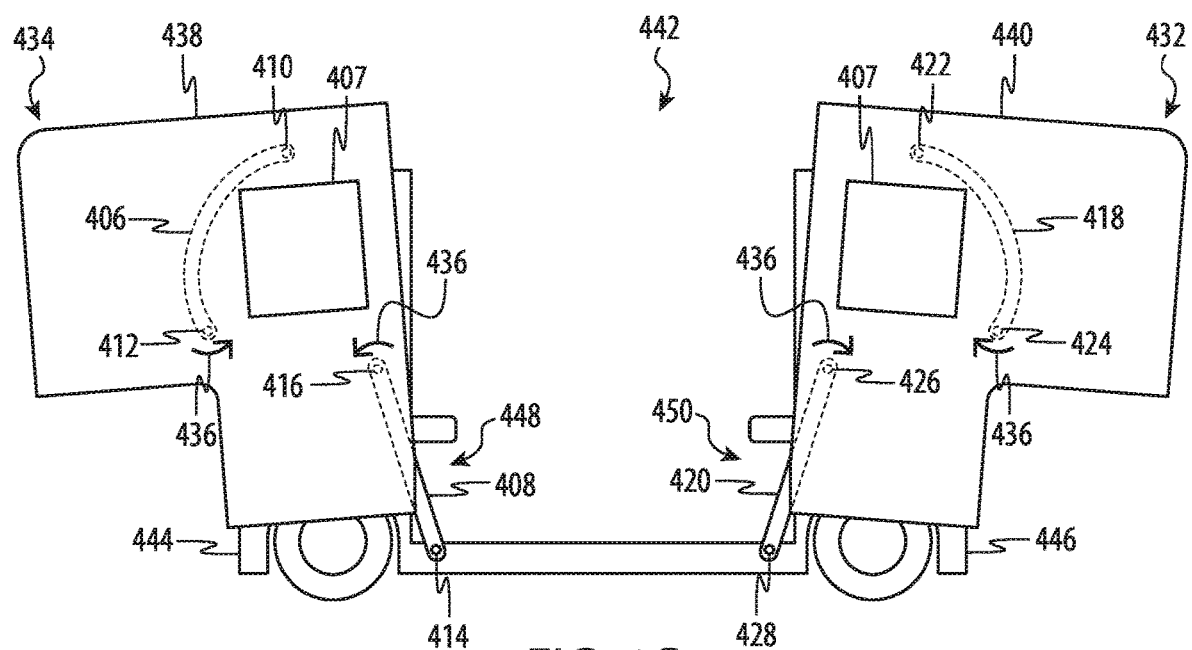

FIGS. 4A-4C illustrate an example vehicle 400 having door linkage mechanisms that include four-bar linkage mechanisms to guide doors 402, 404 between open and closed positions. The four-bar linkages shown in these figures may be part of an overall door mechanism that also includes motors and gear systems that provide the motive force to open and close the doors.

FIG. 4A shows the example vehicle 400 with doors 402, 404 shown in a closed position. The vehicle 400 may be an embodiment of the vehicle 100 or any other vehicle described herein, and the doors 402, 404 may be embodiments of the doors 108, 110, or any other doors described herein. As such, details of the vehicle 100 and the doors 108, 110 will be understood to apply to the vehicle 400 and the doors 402, 404, and for brevity will not be repeated here. For simplicity, some components and functions of the doors 402, 404 are described with reference only to the door 402, though it will be understood that the door 404 may include the same or similar components and may operate in substantially the same manner (though having a mirrored configuration and direction of actuation with respect to the door 402).

The door 402 may be attached to a body 401 of the vehicle 400 via a four-bar linkage mechanism that includes an upper arm 406 and a lower arm 408. The upper arm 406 may be pivotally coupled to the door 402 via a pivot 412 and pivotally coupled to the body 401 via a pivot 410. The lower arm 408 may be pivotally coupled to the door 402 via a pivot 416 and pivotally coupled to the body 401 via a pivot 414. This arrangement of pivots and arms results in the upper arm 406 being in tension and the lower arm 408 in compression. Stated another way, the door 402 is suspended from above by the upper arm 406, while the lower arm 408 supports the door 402 from below. In some cases, the linkage is designed so that the upper arm 406 is only in tension throughout the opening and closing motions of the door 402, and the lower arm 408 is only in compression throughout the opening and closing motions of the door 402. The arms 406, 408 may be formed from or include any suitable material, such as steel, stainless steel, magnesium, aluminum, titanium, metal alloys, fiber-reinforced composites, or the like.

As shown in FIGS. 4A-4C, the lower arm 408 is substantially straight, and the upper arm 406 is curved. Due to the principles of linkages, the particular shape of the arms may not affect the operation of the linkage. For example, the curved upper arm 406 may be replaced with a straight upper arm without changing the operation of the linkage. As shown, the curved upper arm 406 is curved so that it is not visible through a window 407 when the door 402 is in an open position (as shown in FIG. 4C). (Further, the lower arm 408 may not be visible through the window 407 due to its upper pivot being lower than the bottom edge of the window 407.)

The pivots 410, 412, 414, and 416 may be any suitable type of mechanism, component, or arrangement that allows the upper arm 406 and the lower arm 408 to pivot relative to the door 402 and/or body 401. For example, the pivots 410, 412, 414, and 416 may be or may include bearings, bushings, rods in sleeves, pin joints, flexures, living hinges, leaf springs, or the like. In some cases, the pivots 410, 412, 414, and 416 may be configured to accommodate some degree of misalignment. For example, the pivots 410, 412, 414, and 416 may include compliant members that allow the pivots to correctly operate despite slight misalignments due to manufacturing tolerances, wear, external forces (e.g., from wind, snow, forces applied by the other door), or the like. In one example, one or more of the pivots 410, 412, 414, 416 include an elastomeric bushing or mounting that provides compliance between a pivot axis defined by the body 401 and a corresponding pivot axis of a respective arm.

FIG. 4A shows only one side of the vehicle 400, though a substantially identical four-bar linkage may be included on the opposite side of the vehicle to ensure even support of the doors on the vehicle 400. By using two substantially identical four-bar linkages on the opposite sides of each door helps ensure that the doors open and close smoothly and without binding or twisting.

The lengths of the arms 406, 408 and the positions of the pivots 410, 412, 414, 416 may cause the door 402 to articulate along a particular path relative to the body when the door 402 is moved between an open and a closed position. The path may be configured to allow the doors to open and close without interfering with one another, and to ensure that the doors do not substantially interfere with or block ingress or egress from the vehicle. The path may also be configured so that when the doors are moving from a closed position to an open position, the roof segment of the doors tilts away from the central opening where people or freight enter and/or exit. This may help prevent or reduce water or other debris from falling into the vehicle as the doors are being opened or are fully opened.

FIGS. 4A-4C illustrate the vehicle 400 with the doors 402, 404 at various states along the path between the open and closed positions. As shown in FIG. 4A, the doors 402, 404 are in a fully closed position. In this position, inner edges 430, 431 of the doors 402, 404, respectively, may seal against one another. Outer edges 434, 432 of the doors 402, 404, respectively, may seal against the body 401 along the outer ends of the body 401. The doors 402, 404 (and/or the body 401) may include sealing components such as gaskets, elastomer strips, interlocking or overlapping flanges, or the like to facilitate the seals between the doors 402, 404 and between the doors 402, 404 and the body 401. The doors 402, 404 may also include locking and/or latching mechanisms to maintain the doors 402, 404 in the closed position and/or in the open position (FIG. 4C).

The four-bar linkages that support the doors may be configured so that when the doors 402, 404 are in the closed position as shown in FIG. 4A, the doors may be "over-center" such that the weight of the doors acts to force the doors 402, 404 together. In this way, the doors 402, 404 may be in a mechanically stable configuration when they are in the closed position. This may allow the doors to stay closed without requiring constant or an active application of force from a motor or other door actuation system. Further, the weight of the doors may help to engage and compress the seals between the two doors 402, 404 and between the doors 402, 404 and the body 401.

In order to open the doors 402, 404 from the fully closed position to the fully open position, the arms 406, 408 may be actuated to move the door along the path. For example, the arms 406, 408 may be rotated in the direction indicated by the arrows 436. In order to produce this motion, one or more of the arms 406, 408 may be driven by a motor or other actuator, as described in greater detail with respect to FIG. 5.

FIG. 4B shows the vehicle 400 with the doors 402, 404 in an intermediate position between the fully closed position (FIG. 4A) and the fully open position (FIG. 4C). As shown in FIG. 4B, the roof segments 438, 440 of the doors 402, 404 are pitched or angled away from the central opening 442 of the vehicle 400. As described above, by pitching the roof segments away from the central opening, water, leaves, dirt, or other debris that may be on top of the roof segments 438, 440 may be caused to flow or slide away from the central opening 442.

FIG. 4C shows the vehicle 400 with the doors 402, 404 in a fully open position. In this position, the central opening 442 is fully or nearly fully exposed to allow people or freight to enter or exit the vehicle 400. As shown in FIG. 4C, the roof segments 438, 440 of the doors 402, 404 are still pitched away from the central opening 442 when the doors 402, 404 are in the fully open position, though to a lesser extent (e.g., at a less steep angle relative to horizontal) than in the intermediate position shown in FIG. 4B. Indeed, in some cases the roof segments 438, 440 of the doors 402, 404 may be pitched away from the central opening 442 throughout their entire path between open and closed positions. This may help prevent water and other debris from being directed down and towards the central opening 442.

As noted above, the upper arm 406 may be curved or otherwise shaped so that it does not become visible through the window 407 when the door 402 is in the open position. FIG. 4C illustrates how the shape of the upper arm 406 avoids the window. Of course, other shapes and configurations for the upper arm 406 are also contemplated, and those shapes or configurations may be designed so that they do not interfere with other components of the vehicle.

As shown in FIG. 4C, when the doors 402, 404 are in the fully open position, a roofless span of the vehicle 400 is exposed. More particularly, the body 401 of the vehicle 400 may define a roofless span between two body segments 444, 446 of the body 401. The lack of a roof along the roofless span may help provide a large, uninterrupted opening into the vehicle 400 to allow easy ingress and egress by passengers, freight, or other vehicle payload. For example, a person can walk onto the vehicle without having to squat or bend over and may freely maneuver themselves in the vehicle before sitting down onto a seat. When the doors 402, 404 are moved to their closed position (FIG. 4A), the side segments and roof segments of the doors 402, 404 cover the central opening 442 (and the roofless span along the top of the central opening 442) and enclose the interior volume of the vehicle 400.

The linkage may also be configured so that the doors are also "over-center" when the doors 402, 404 are in the open position as shown in FIG. 4C. Thus, doors 402, 404 may be in a mechanically stable configuration when they are in the open position, and it may not be necessary to apply constant force from a motor or other door actuation system to maintain the doors in the open position. In some cases, however, a motor or other door actuation system applies a constant force to the doors to maintain them in the open position, such as to ensure that they do not accidentally close and/or to maintain them in the open position if the vehicle is on a sloped surface. A brake may also be used to hold the doors 402, 404 in the open (or closed) position. Further, the vehicle 400 may include hard-stops or travel limiting features that establish the fully open and fully closed positions of the doors 402, 404 and mechanically prevent the doors 402, 404 from extending past those positions. In some cases, FIG. 4A shows the doors 402, 404 against the hard stops that establish the fully closed position, and FIG. 4C shows the doors 402, 404 against the hard stops that establish the fully open position. The hard stops may be configured to engage any component of the doors 402, 404, such as but not limited to the door structures or the arms of the four-bar linkages.

The four-bar linkages that guide the doors 402, 404 along their respective paths may also be configured so that the doors 402, 404 do not interrupt or extend into the central opening proximate the bottom of the central opening 442. For example, as shown in FIG. 4C, the bottom corners 448, 450 of the doors 402, 404, respectively, are substantially flush with the body segments 444, 446. (In other cases they may be behind the body segments, or they may extend a small amount into the central opening 442, such as six inches or less.) This may help maximize the size of the opening, thereby preventing the doors 402, 404 from interfering with the loading or unloading of passengers or freight. In another example, the doors 402, 404 may be configured to overhang the body of the vehicle so that there is no gap between the bottom edge of the doors 402, 404 and the floor of the vehicle. This may help prevent objects (e.g., luggage, or a passenger's foot) from becoming trapped between the doors 402, 404 and the floor of the vehicle.

In some cases, the arms 406, 408, 418, and 420 may be entirely or substantially enclosed between two door panels. For example, the doors 402, 404 may include an outer shell, which defines an exterior surface of the vehicle, and an inner shell, which defines an interior surface of the passenger compartment. The arms 406, 408, 418, and 420 may be positioned between the inner and outer shells of the doors, thus enclosing the arms to prevent unwanted or accidental access to or contact with the arms 406, 408, 418, and 420, especially when they are moving to actuate the doors.

As shown in the example vehicles in FIGS. 1A-4C, the doors do not sit flush with the body of the vehicle when the doors are closed. In another example configuration, the doors are configured to nest with the body so that the exterior surfaces of the doors are substantially flush with adjacent exterior surfaces of the body. In order to allow for a four-bar linkage to open the doors in this configuration, the body may have a tapered or angled configuration, such as a generally trapezoidal shape when viewed from an end of the vehicle (e.g., the end 102). When the doors are opened, the initial motion of the doors may be substantially directly upwards (e.g., vertical). In this way, as the doors move upwards, the doors are lifted out of their nested position and a clearance is defined between the doors and the body. Once sufficient clearance is produced, the doors may be articulated backwards (e.g., towards an open position) to allow loading or unloading of passengers or freight.

Figure 5:
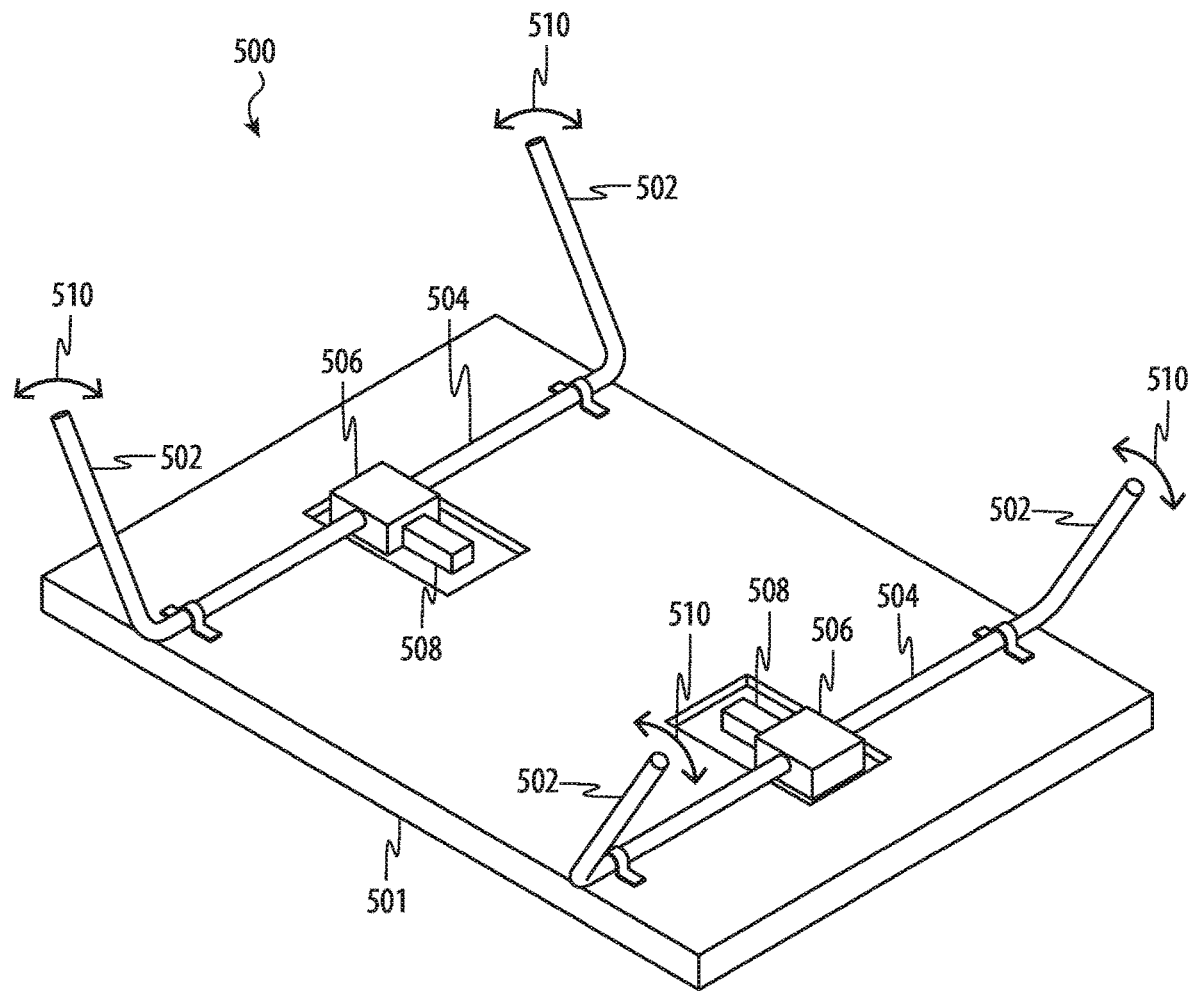
FIG. 5 depicts a portion of a vehicle including a mechanism for opening and closing vehicle doors.

FIG. 5 illustrates a portion of a vehicle 500, showing a portion of an example door mechanism. The door mechanism includes a pair of arms 502 coupled to a crossbar 504. One of the arms 502 may correspond to the arm 408 in FIGS. 4A-4C (and the other may correspond to the arm on the opposite side of the door 402 in FIGS. 4A-4C, which moves in concert with the arm 408). The door mechanism may also include a motor 508 and gear system 506 that are coupled to the frame structure 501 and are configured to rotate the crossbar 504. The motor 505 may be an electric motor, hydraulic motor, pneumatic motor, or any other suitable type of motor. The gear system 506 may be any suitable type of gear box, gear reducer, or other mechanical system that converts motion of the motor 508 to rotation of the crossbar 504.

When the motor 508 is commanded to move (e.g., by a control system of the vehicle), the motor 508 may rotate to cause the arms 502 to rotate or move as indicated by arrows 510. The ends of the arms 502 may be pivotally attached to a door structure, as described with respect to FIGS. 4A-4C, and thus the motion of the arms 502 may cause the door structure to move along the path between the open and closed positions. In some cases, the motor 508 provides the sole motive force for opening and closing the door structure under normal operating conditions.

While FIG. 5 illustrates one example system and technique for moving the arms 502 as indicated by arrows 510, other systems and mechanisms are also possible. For example, one or more linear actuators may be coupled to one or both of the arms 502 to move the arms 502. As another example, each arm 502 may be associated with its own motor, and both motors may be controlled independently (and optionally simultaneously) to move the arms 502 to open and close the doors. As yet another example, a linear actuator may be coupled to a lever arm that is secured to the crossbar 504. The linear actuator may apply a force to the lever arm that rotates the crossbar 504 to open and close the doors.

The door mechanism shown in FIG. 5 may be operated under a closed-loop control system. For example, a position of the door (e.g., a position along its opening and closing path) may be provided to a control system of the vehicle, and the motor may be controlled at least in part based on the positional feedback of the door. For example, when the door is being moved towards a terminal position (e.g., fully opened or fully closed), the motor may be ordered to cease moving when the door reaches the target terminal position. Other aspects of motion, such as speed, acceleration, and the like, may also be varied based at least in part on the positional feedback of the door. The position of the door may be determined in any suitable way, such as via a feedback device coupled to a door, a crossbar 504, any of the arms coupling a door to a vehicle body, or any other suitable location or component of the vehicle. The feedback device may be an encoder, resolver, potentiometer, Hall effect sensor, or any other suitable device. Electromechanical limit switches may also be used to control the operation and motion of the doors.

As described above, a vehicle using the doors and door mechanisms described herein may include two doors that may operate in synch with (or optionally independently of) each other. FIG. 5 also illustrates an additional door mechanism that may be used to operate a second door of a vehicle. While the additional door mechanism is not separately labeled, it may include the same or similar components as the door mechanism described above, and may perform the same or similar functions.

The door mechanism may also include other components that help move the doors in a smooth, safe, and efficient manner. For example, the door mechanism, or the vehicle more broadly, may include counterbalance mechanisms that may reduce the apparent weight of the door during opening and/or closing operations. For example, the vehicle may include springs coupled to one or more of the arms of the four-bar linkages (or to a crossbar or any other suitable structure or component) that apply a counterbalancing force to the doors when they are in the open and/or closed position. As another example, a torsion spring may be wound around and coupled to the crossbar to impart a counterbalancing force, or a torsion bar may extend through a hollow center of the crossbar and coupled to the crossbar to impart a counterbalancing force. In operation, these mechanisms may cause the doors to require less force to open and close than would otherwise be necessary without the counterbalance mechanisms. Counterbalance mechanisms may be or include any suitable type of components and/or mechanisms, such as coil springs, leaf springs, cables, torsion bars, weights, or the like. In some cases, multiple counterbalance mechanisms may be employed, such as a first mechanism to reduce the force required for opening the door, and a second mechanism to reduce the force required to close the door. The door mechanism may also include dashpots, dampers, soft-close or soft-open mechanisms, or other components that help produce safe and smooth operation. For example, the vehicle may have dampers that mechanically slow the doors near or at the end-of-travel positions of the doors (e.g., as the doors are approaching fully open or fully closed).

Figure 6:
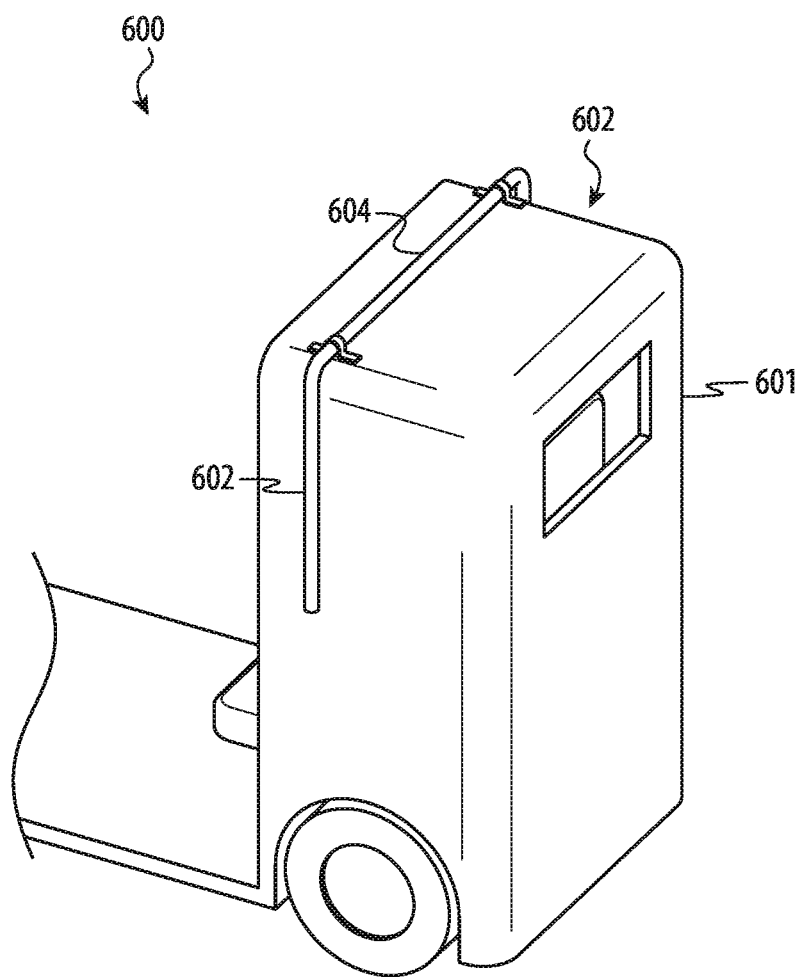
FIG. 6 depicts a partial view of a vehicle showing a pair of arms for supporting a door.

FIG. 6 illustrates a portion of a vehicle 600, showing an example of how a pair of upper arms 602 may be integrated with or otherwise attached to the vehicle 600. One of the upper arms 602 may correspond to the arm 406 in FIGS. 4A-4C (and the other may correspond to the arm on the opposite side of the door 402 in FIGS. 4A-4C, which moves in concert with the arm 406). The upper arms 602 may join a crossbar 604 that extends along a width of the vehicle 600. In some cases, the upper arms 602 may be securely attached to the crossbar 604, such that movements of the upper arms 602 are synchronized due to the substantially rigid connection through the crossbar 604. In other cases, the crossbar 604 may be omitted such that each upper arm 602 can move independently of the other. As described above, a positional feedback device may be coupled to the crossbar 604 to indicate the position of the door (e.g., based on the rotational position of the crossbar).

Figure 7:
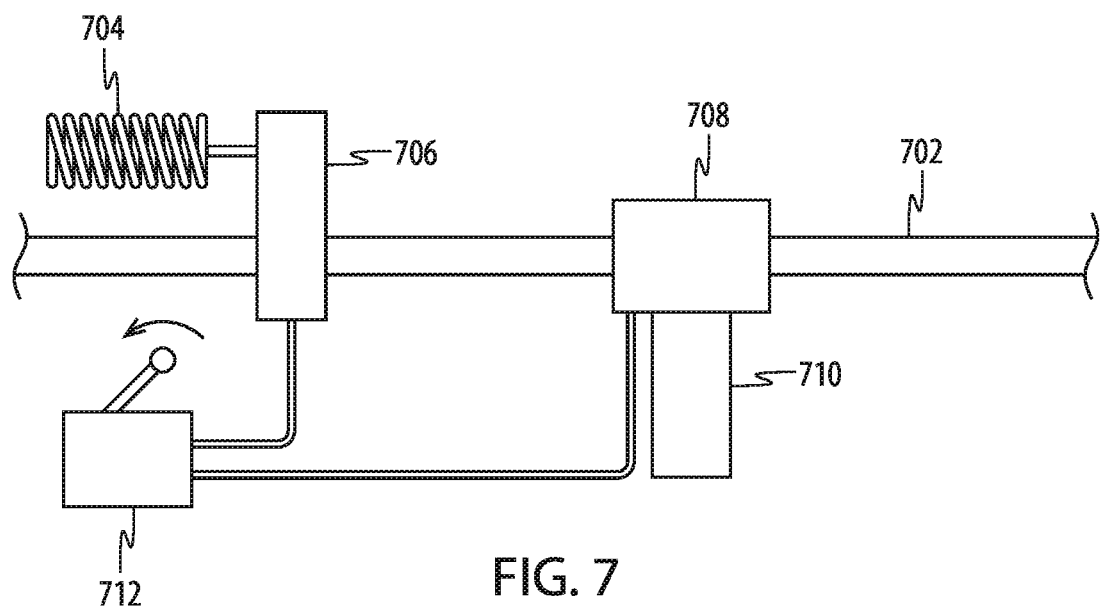
FIG. 7 depicts an example supplemental door opening mechanism.

In some cases, vehicles that use doors as described herein may include a supplemental door opening mechanism to help open the doors in case the doors are unable to be opened via a primary opening system (e.g., the motor and gear system described with respect to FIG. 5. FIG. 7 illustrates an example mechanical door opening mechanism that may be used instead of the primary opening system and which may be operable manually and without electrical power.

FIG. 7 shows a crossbar 702, a motor 710, and a gear system 708, which may be embodiments of the corresponding components shown in FIG. 5. As described above, the motor 710 may open and close a door (e.g., move the door between an open and a closed position) by rotating the crossbar 702 through the gear system 708.

The supplemental door opening mechanism may include a spring 704 and a selectively engageable coupling mechanism 706. The selectively engageable coupling mechanism 706 may be a clutch or any other suitable mechanism (e.g., a slotted collar that is coupled to the spring 704 and receives in its slot a pin that is attached to the crossbar 702). Other types of selectively engageable coupling mechanisms may also be used.

The spring 704 may be a pre-tensioned torsion spring or any other suitable energy storage component, such as a torsion bar. While shown offset from the crossbar 702, the torsion spring (or an optional torsion bar) may be coaxial with the crossbar 702. The selectively engageable coupling mechanism 706 may be configured to decouple the spring 704 from the crossbar 702 during normal operating conditions or otherwise allow the crossbar 702 to move without interference from the spring 704 during normal operating conditions. This allows the motor 710 to rotate the crossbar 702 without having to overcome spring force imparted on the crossbar 702 by the spring 704.

The gear system 708 and the selectively engageable coupling mechanism 706 may be coupled to a door release mechanism 712. The door release mechanism 712 may be a handle, button, lever, or other passenger-accessible affordance that can be used to initiate the supplemental door opening mechanism. The gear system 708 and the selectively engageable coupling mechanism 706 may be coupled to the door release mechanism 712 via cables, linkages, gear systems, hydraulic or pneumatic lines, or the like. In some cases, multiple redundant connections between the gear system 708 and the selectively engageable coupling mechanism 706 and the door release mechanism 712 may be provided.

When the door release mechanism 712 is actuated, the spring 704 may be released and the selectively engageable coupling mechanism 706 may be caused to engage the crossbar 702, thereby allowing a rotational force from the spring to be transmitted to and/or through the crossbar 702. Actuation of the door release mechanism 712 may also cause a release mechanism of the gear system 708 to decouple the motor 710 (and/or other gears or couplings) from the crossbar, thus allowing the crossbar 702 to rotate substantially freely, or at least without significant mechanical opposition from the gear system 708 and/or the motor 710. Together, these actions allow the force stored in the spring 704 to rotate the crossbar 702 in a direction that will cause the door to move from a closed position to an open position. In some cases, the spring 704 and/or the selectively engageable coupling mechanism 706 includes a speed control mechanism that controls or limits the speed of the door when it is opened by the supplemental door opening mechanism. For example, the speed control mechanism may prevent the door from slamming into the open position at a speed that may be dangerous to occupants, bystanders, or the vehicle.

Figure 8B:
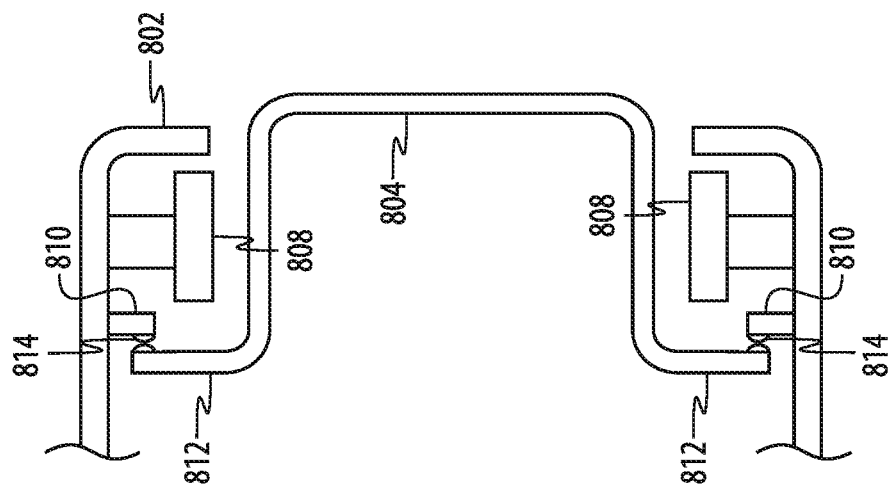
FIGS. 8A-8B depict another example vehicle.
Figure 8A:
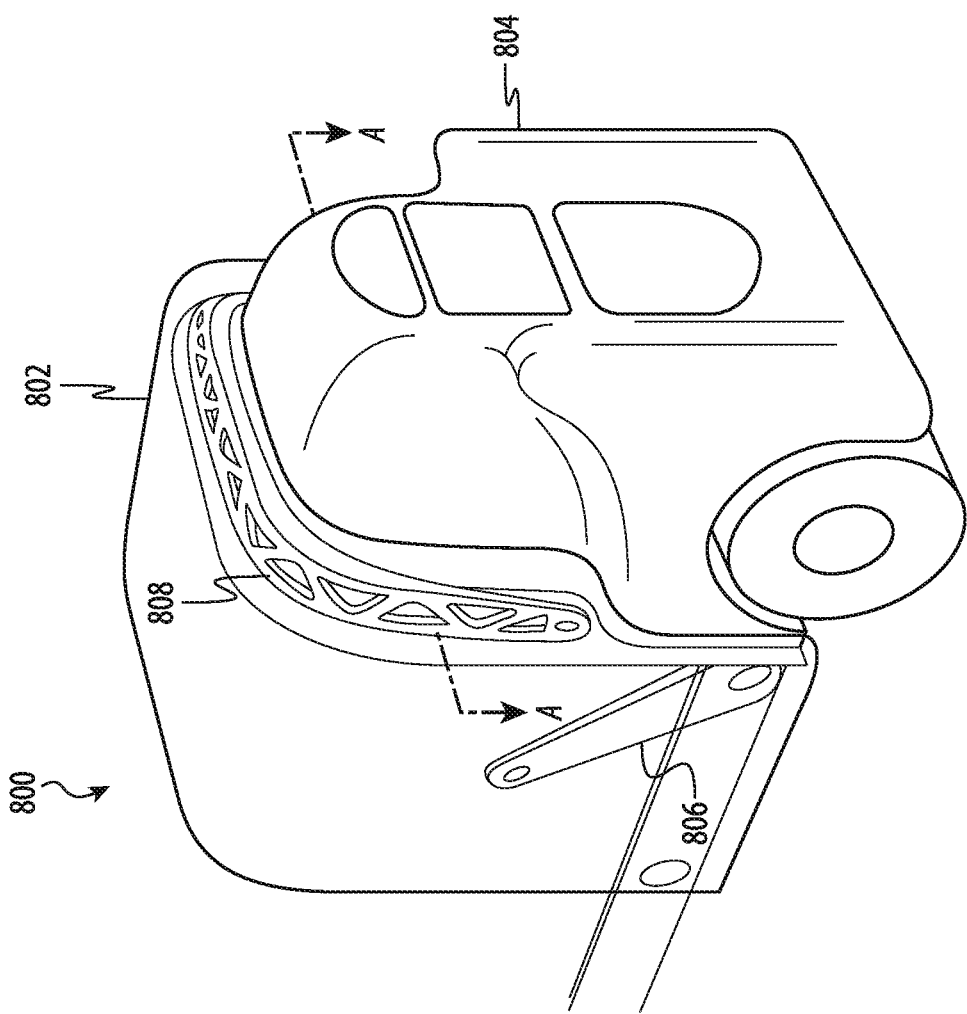

FIGS. 8A-8B illustrate another example configuration of a vehicle 800 in accordance with the principles described herein. FIG. 8A shows a perspective view of a portion of a vehicle 800. The vehicle 800 includes a body structure 804 and a door 802. The door 802 may be movably coupled to the body structure 804 via arms 806, 808. The body structure, door, and arms shown in FIG. 8A may be embodiments of or similar to corresponding components described elsewhere herein. (Portions of the door 802 are shown as transparent to allow the arms 806, 808 to be depicted, but it will be understood that the door 802 may not actually be transparent.)

FIG. 8B is a partial cross-sectional view of the vehicle 800, viewed along line A-A in FIG. 8A, illustrating how the door 802 may interface with the body 804 to define a seal at the outer end of the vehicle 800. In particular, the door 802 may include sealing flanges 810 that are positioned to overlap corresponding sealing flanges 812 of the body structure 804. When in the closed position (as shown in FIGS. 8A-8B), the flanges 810 may engage the flanges 812 to form a seal along the seams 814. In some cases, the flanges 810, 812 may extend around substantially the entire u-shaped interface between the door 802 and the body structure 804 to define a continuous seal along the door-body interface. One or both of the sealing flanges 810, 812 may include sealing members such as elastomer or foam gaskets, strips, or other complaint components that may prevent the ingress of water, animals, bugs, or other contaminants into the vehicle, and may also help maintain cooled or heated air inside the vehicle to enhance the comfort and/or safety of the occupants.

While the foregoing discussion and figures show doors being movably coupled to a vehicle body structure via a four-bar linkage mechanism, other types of coupling and/or actuation mechanisms may also or instead be used. For example, doors may be movably coupled to a body structure via sliding mechanisms, hinges, other types of mechanical linkages (e.g., having more or fewer arms and joints than shown in the instant figures), or the like. Further, in some cases a slot in the doors or the vehicle body may define a cam profile, and a pin or rod may extend into the slot. As the doors are opened and closed, the cam profile of the slot may cause the doors to move along a desired path (which may be the same path that is produced by the four-bar linkage described above, or a different path).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A vehicle comprising:
    a first seat;
    a second seat;
    a vehicle body comprising:
        a first body segment defining a first roof segment positioned over the first seat of the vehicle; and
        a second body segment set apart from the first body segment by a roofless span and defining a second roof segment positioned over the second seat of the vehicle;
    a first canopy door defining:
        a third roof segment; and
        a first pair of side segments extending from opposite sides of the third roof segment; and
    a second canopy door comprising:
        a fourth roof segment; and
        a second pair of side segments extending from opposite sides of the fourth roof segment, wherein:
    when the first canopy door and the second canopy door are in a closed position, a first inner edge of the first canopy door is positioned in the roofless span and sealed against a second inner edge of the second canopy door; and
    when the first canopy door and the second canopy door are in an open position, the roofless span is exposed and the first body segment is at least partially enclosed by the first canopy door and the second body segment is at least partially enclosed by the second canopy door.

2. The vehicle of claim 1, wherein, when the first canopy door and the second canopy door are in the closed position:
    a first outer edge of the first canopy door is sealed against the first body segment; and
    a second outer edge of the second canopy door is sealed against the second body segment.

3. The vehicle of claim 1, wherein:
    the first inner edge extends continuously along the third roof segment and the first pair of side segments of the first canopy door; and
    the second inner edge extends continuously along the fourth roof segment and the second pair of side segments of the second canopy door.

4. The vehicle of claim 1, wherein, when the first canopy door and the second canopy door are in the open position, the third roof segment and the fourth roof segment are pitched away from the roofless span.

5. The vehicle of claim 1, further comprising:
    a first door mechanism coupled to the first canopy door and configured to move the first canopy door between the closed position and the open position; and
    a second door mechanism coupled to the second canopy door and configured to move the second canopy door between the closed position and the open position.

6. The vehicle of claim 5, wherein the first door mechanism and the second door mechanism are configured to simultaneously move the first canopy door and the second canopy door, respectively, from the closed position to the open position.

7. The vehicle of claim 1, wherein:
    the third roof segment extends over the first roof segment when the first canopy door is in the open position and in the closed position; and
    the fourth roof segment extends over the second roof segment when the second canopy door is in the open position and in the closed position.

8. The vehicle of claim 1, wherein the first seat and the second seat face opposite directions.

9. A vehicle comprising:
    a body defining a first seating area and a second seating area and comprising:

a first body segment defining a first roof segment positioned over the first seating area; and a second body segment set apart from the first body segment by a roofless central opening extending to an interior floor of the vehicle, the second body segment defining a second roof segment positioned over the second seating area;

a first door structure comprising:
a first side segment;
a second side segment opposite the first side segment; and
a third roof segment extending from the first side segment to the second side segment; and a second door structure comprising:
a third side segment;
a fourth side segment opposite the third side segment; and
a fourth roof segment extending from the third side segment to the fourth side segment; wherein:

when the first door structure and the second door structure are in a closed position, the first door structure and the second door structure fully enclose the roofless central opening; and when the first door structure and the second door structure are in an open position, the roofless central opening is exposed.

10. The vehicle of claim 9, wherein, when the first door structure and the second door structure are in the closed position, an inner edge of the first door structure forms a waterproof seal against an inner edge of the second door structure.

11. The vehicle of claim 10, wherein, when the first door structure and the second door structure are in the closed position:

an outer edge of the first door structure forms a first waterproof seal against the body of the vehicle; and
an outer edge of the second door structure forms a second waterproof seal against the body of the vehicle.

12. The vehicle of claim 9, wherein:
the first body segment is set apart from the second body segment by a first distance; and
when the first door structure and the second door structure are in the open position, an inner edge the first door structure is set apart from an inner edge of the second door structure by a second distance greater than or equal to the first distance.

13. The vehicle of claim 9, wherein, when the first door structure and the second door structure are in the open position, the third roof segment and the fourth roof segment are pitched away from the roofless central opening.

14. The vehicle of claim 9, further comprising:
a first four-bar linkage coupling the first door structure to the body; and
a second four-bar linkage coupling the second door structure to the body.

15. A vehicle comprising:
a first pair of wheels at a first end of the vehicle and configured to steer the vehicle when the vehicle is travelling in a direction of the first end of the vehicle;
a second pair of wheels at a second end of the vehicle and configured to steer the vehicle when the vehicle is travelling in a direction of the second end of the vehicle; and
a pair of canopy doors positionable in an open position in which a roofless span of the vehicle is exposed and a closed position in which the roofless span of the vehicle is enclosed, the pair of canopy doors having a same shape and comprising:
a first canopy door defining a first roof segment and a first pair of side segments extending from the first roof segment; and
a second canopy door defining a second roof segment and a second pair of side segments extending from the second roof segment, wherein:
the first roof segment and the second roof segment are pitched away from a center of the roofless span of the vehicle when the pair of canopy doors are in the open position.

16. The vehicle of claim 15, wherein the first roof segment and the second roof segment are substantially parallel to a floor of the roofless span when the pair of canopy doors are in the closed position.

17. The vehicle of claim 15, wherein the first roof segment and the second roof segment remain pitched away from the center of the roofless span while the pair of canopy doors are moved from the closed position to the open position.

18. The vehicle of claim 15, further comprising a door actuation system configured to move the pair of canopy doors from the closed position to the open position simultaneously.

19. The vehicle of claim 15, wherein:
the vehicle is symmetrical about a center plane; and
when the pair of canopy doors are in a closed position, respective inner edges of the respective canopy doors meet at the center plane.

20. The vehicle of claim 15, wherein the pair of canopy doors are symmetrical about a center plane of the vehicle.

* * * * *